A. H. FOX.
SHOCK ABSORBER.
APPLICATION FILED MAY 13, 1915.
1,172,588.
Patented Feb. 22, 1916.
2 SHEETS—SHEET 2.
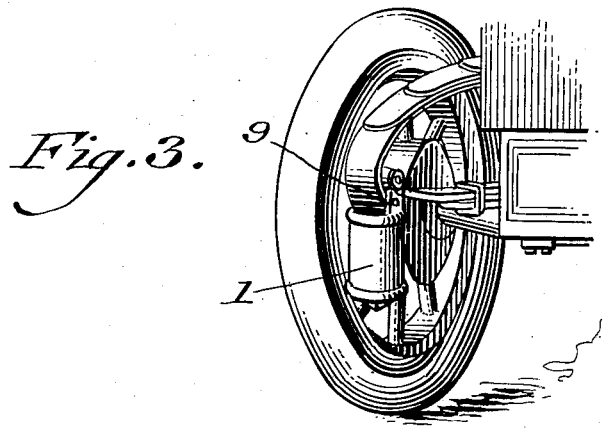
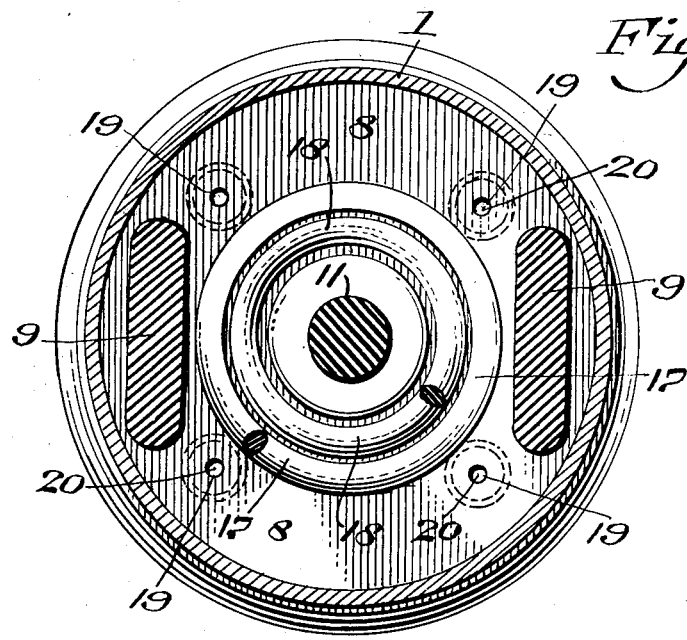

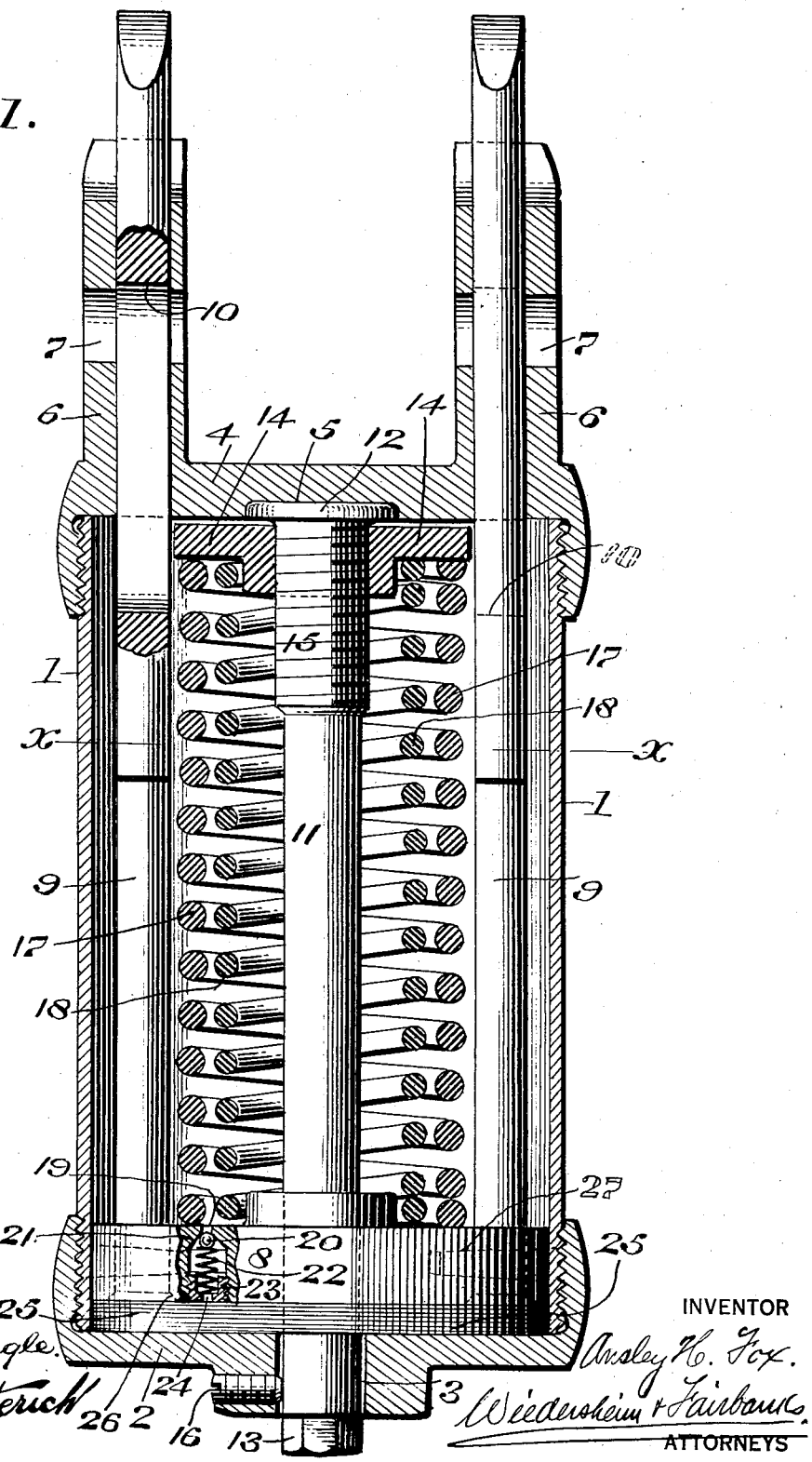

UNITED STATES PATENT OFFICE.

ANSLEY H. FOX, OF PHILADELPHIA, PENNSYLVANIA, ASSIGNOR TO FOX PNEUMATIC SHOCK-ABSORBER CO., OF PHILADELPHIA, PENNSYLVANIA, A CORPORATION OF DELAWARE.

SHOCK-ABSORBER.

1,172,588.  Specification of Letters Patent.  Patented Feb. 22, 1916.

Application filed May 13, 1915. Serial No. 27,755.

*To all whom it may concern:*

Be it known that I, ANSLEY H. Fox, a citizen of the United States, residing in the city and county of Philadelphia, State of Pennsylvania, have invented a new and useful Shock-Absorber, of which the following is a specification.

My invention relates to a new and useful shock absorber, wherein I provide means for air cushioning the piston after it has been moved against the action of the compression spring employed.

It further consists of other novel features of construction, all as will be hereinafter set forth.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 is a vertical sectional view of a shock absorber embodying my invention, showing portions broken away. Fig. 2 is a sectional view on the line $x$—$x$ Fig. 1. Fig. 3 is a perspective view, showing the shock absorber connected with a vehicle spring.

Similar numerals of reference indicate corresponding parts in the figures.

Referring to the drawings:—1 designates a casing or cylinder to which is connected, in any suitable or desired manner, a bottom cap 2 having a suitable opening 3 therethrough, and connected with the opposite end of the casing is the top cap 4 having a suitable recess 5 therein and provided with bored extensions 6 having shackled bolt openings 7 therethrough, and by means of which the casing is suitably connected with one member of a vehicle spring.

8 designates a piston movable in said casing and to which are connected the rods 9, which extend therefrom through the suitable bores in the extensions 6 to a point exterior thereof and are provided with suitable means for connection with the other member of the vehicle spring. Each rod is provided with a suitable slot 10, through which the shackled bolt may extend and in order that movement of the rods is permitted.

11 designates the spring adjusting bolt having a head 12 seated in the recess 5 of the top cap 4 which thus serves as a journal for the bolt, and the opposite end of the bolt extends through the opening 3 of the bottom cap and is provided with a squared end 13 exterior thereof for engagement, in order to rotate the bolt 11. It will be understood that, as here shown, the bolt 11 does not closely fit the opening of the bottom cap 2 in order to permit the escape of a suitable amount of air, as will be hereinafter described.

14 designates an abutment, here shown as a plate, in adjustable engagement with the bolt 11, here shown as engaging with the thread 15 on the bolt and said abutment being suitably shaped in order that the same will engage with the sides of the rods 9 to prevent rotation thereof. By this means, it will be understood that by the rotation of the bolt 11, the position of the abutment 14 may be varied with respect to the piston. In order to lock the bolt 11 against rotation, I have shown the set screw 16, so that by proper operation of the bolt 11 and the set screw 16, the position of the plate 14 may be varied on the bolt 11 and may be locked by the set screw in its different positions.

17 and 18 designate two compression springs interposed between the plate 14 and the piston 8, each having one end bearing against the plate and its opposite end bearing against the piston, said springs tending to hold the piston in and return it to its normal position, and the compression action of the said springs may be varied by the adjustment of the abutment 14. Suitable means is provided for discharging air beneath the piston when the same is elevated against the action of the springs, in order that an air cushion will be provided for the return movement of said piston. As here disclosed, I have shown a plurality of ports 19 through the piston, each controlled by a valve 20 adapted to seat against a seat 21 and which valve is held in and returned to closed position by a spring 22 bearing against it and against a removable plug 23 which is connected with the piston and has a port 24 therethrough. In the lower portion of the casing or cylinder 1, here shown as resting upon the bottom cap 2, I provide a buffer 25 having a suitable opening for passage of the bolt 11 and which buffer may be of any suitable material, such as wood, against which the piston can abut upon its return movement. The rods 9 are connected in any suitable manner with the piston 8 and, as here shown, they are provided with a head 26 countersunk into the lower portion of the piston and dowel pins 27 serve to lock the parts together.

The operation of the parts is as follows:— An inequality in the road being encountered, the piston rods 9 will be elevated, carrying with them the piston 8 and compressing the two springs 17 and 18. As the piston is elevated, the air in the cylinder will overcome the tension of the springs 22, unseating the valves 20, and the air upon the upper side of the piston will be directed to the other side thereof, so that when the springs 17 and 18 act to return the piston 8, the valve 20 will be closed, and the air will act as a cushion for the return movement of the piston, thus cutting out the rebound. A suitable amount of air will be permitted to escape, without impairing the cushioning action around the spring adjusting bolt 11 through the opening 3. By using two springs in place of one, I have provided for a greater degree of flexibility and the compression of the springs may be varied, as previously described, by proper rotation of the bolt 11 to vary the position of the abutment 14 thereon. While I have shown the valves as carried by the piston, it will be understood that the same may be mounted in any suitable position and may be of any suitable construction, in order to accomplish the desired result.

It will now be apparent that I have devised a novel and useful shock absorber, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A shock absorber comprising in combination a casing adapted for connection with one member of a vehicle spring, a piston movable therein, a pair of compression springs bearing at one end against the piston and against an abutment at the opposite end, and tending to hold the piston in and return the same to normal position, means for adjusting the compression of said springs from the exterior of the casing, means for discharging air beneath said piston as it is moved against the action of the spring to act as a cushion upon the return movement of the piston, and means for connecting the piston with the other member of a vehicle spring.

2. A shock absorber comprising a casing adapted for connection with one member of a vehicle spring, a piston movable therein with its edges in close contact therewith, a bolt rotatably mounted in the casing and having bearings in said casing for its upper and lower ends and passing through said piston to assist in guiding it in its movement, an abutment in adjustable connection with the bolt, a compression spring bearing at one end against the abutment and at the opposite end against the piston to hold it in and return it to normal position, means carried by the piston for discharging air beneath said piston as it is moved against the action of the spring to act as a cushion upon the return movement of the piston, and rods connected with the piston on opposite sides of the bolt and extending exteriorly of the casing for connection with the other member of the vehicle spring.

3. A shock absorber, comprising in combination, a casing adapted for connection with one member of a vehicle spring, a cap connected with said casing and having a bearing in its inner face, a piston movable in said casing and engaging the walls thereof, a valve carried by the piston for discharging air beneath said piston as it is moved upwardly, a bolt rotatably mounted in the casing passing through the piston and having one end seated in said bearing and the opposite end extending exteriorly of the casing, an abutment adjustably mounted on the bolt, a pair of concentric compression springs bearing at one end against the abutment and at its opposite end against the piston to hold it in and return it to normal position, and rods connected with the piston on opposite sides of the bolt and extending exteriorly of the casing for connection with the other member of the vehicle spring.

ANSLEY H. FOX.

Witnesses:
C. D. McVay,
F. A. Newton.